United States Patent
Yu et al.

(10) Patent No.: US 10,337,420 B2
(45) Date of Patent: Jul. 2, 2019

(54) METHOD FOR CONTROLLING ENGINE SYSTEM

(71) Applicant: HYUNDAI MOTOR COMPANY, Seoul (KR)

(72) Inventors: Seung Eun Yu, Seoul (KR); Young Ho Kim, Hwaseong-si (KR); Hyo Sang Cho, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 398 days.

(21) Appl. No.: 15/175,581

(22) Filed: Jun. 7, 2016

(65) Prior Publication Data

US 2017/0096953 A1    Apr. 6, 2017

(30) Foreign Application Priority Data

Oct. 6, 2015 (KR) .......................... 10-2015-0140388

(51) Int. Cl.
    *F02B 33/44*     (2006.01)
    *F02D 41/00*     (2006.01)
    (Continued)

(52) U.S. Cl.
    CPC .......... *F02D 41/0007* (2013.01); *F02B 33/34* (2013.01); *F02B 37/04* (2013.01);
    (Continued)

(58) Field of Classification Search
    CPC ....... F02B 37/007; F02B 37/013; F02B 37/04
    (Continued)

(56) References Cited

U.S. PATENT DOCUMENTS

2014/0053547 A1*   2/2014   Wade ..................... F02B 37/04
                                                                                60/599
2015/0159545 A1   6/2015   Cowgill et al.
(Continued)

FOREIGN PATENT DOCUMENTS

JP      2002-310046 A    10/2002
JP      2006-348831 A    12/2006
(Continued)

OTHER PUBLICATIONS

Machine translation of JP 2006348831 A.*
Korean Office Action issued in Application No. 10-2015-0140388 dated Jan. 15, 2017.

*Primary Examiner* — Ngoc T Nguyen
(74) *Attorney, Agent, or Firm* — Morgan Lewis & Bockius LLP

(57) ABSTRACT

A method for controlling an engine system having a supercharger and a turbocharger includes: an accelerator-pedal-opening-degree determination operation of determining whether an opening degree of an accelerator pedal detected after an engine starts is a first reference value or more; a first coolant temperature determination operation of determining whether, when the opening degree of the accelerator pedal is less than the first reference value, a detected temperature of a coolant is a second reference value or more; a second coolant temperature determination operation of determining whether the temperature of the coolant is the second reference value or more and is within a temperature threshold; and a boosting operation of calculating boosting contribution rates of the supercharger and the turbocharger, respectively, when the determined temperature of the coolant is within the temperature threshold and driving the supercharger and the turbocharger using the calculated boosting contribution rates.

7 Claims, 3 Drawing Sheets

(51) Int. Cl.
*F02B 37/22* (2006.01)
*F02D 41/10* (2006.01)
*F02D 41/06* (2006.01)
*F02B 37/04* (2006.01)
*F02B 39/10* (2006.01)
*F02M 31/04* (2006.01)
*F02B 33/34* (2006.01)
*F02B 29/04* (2006.01)
*F02M 26/05* (2016.01)
*F02M 26/15* (2016.01)

(52) U.S. Cl.
CPC ............ *F02B 37/225* (2013.01); *F02B 39/10* (2013.01); *F02D 41/064* (2013.01); *F02D 41/068* (2013.01); *F02D 41/10* (2013.01); *F02M 31/042* (2013.01); *F02B 29/0406* (2013.01); *F02D 2200/02* (2013.01); *F02M 26/05* (2016.02); *F02M 26/15* (2016.02); *Y02T 10/144* (2013.01)

(58) Field of Classification Search
USPC .............................................. 60/612; 123/562
See application file for complete search history.

(56) References Cited

U.S. PATENT DOCUMENTS

| | | | |
|---|---|---|---|
| 2016/0061104 A1* | 3/2016 | Hirayama | F02D 41/12 60/602 |
| 2017/0016389 A1* | 1/2017 | Xiao | F02B 37/14 |
| 2017/0030259 A1* | 2/2017 | Tabata | F02D 41/10 |
| 2017/0067393 A1* | 3/2017 | Xiao | F02B 37/04 |

FOREIGN PATENT DOCUMENTS

| | | |
|---|---|---|
| JP | 2009-191686 A | 8/2009 |
| KR | 10-1998-060436 A | 4/2000 |

* cited by examiner

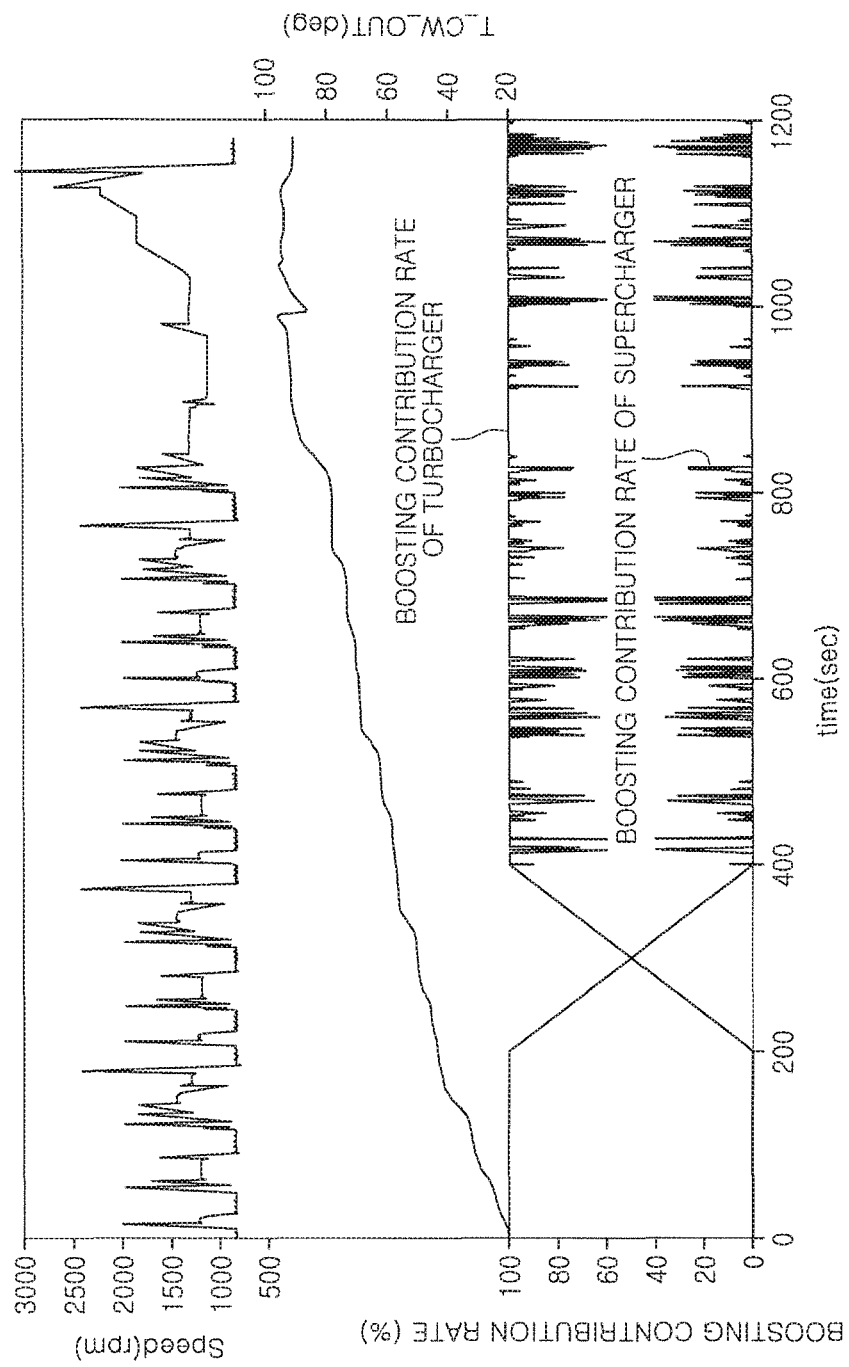

METHOD FOR CONTROLLING ENGINE SYSTEM

CROSS REFERENCE TO RELATED APPLICATION

The present application claims the benefit priority to Korean Patent Application No. 10-2015-0140388, filed on Oct. 6, 2015, the entire content of which is incorporated herein for all purposes by this reference.

TECHNICAL FIELD

The present disclosure relates to an engine system having a turbocharger and a supercharger, and more particularly, to a method for controlling the engine system in which harmful exhaust gas emissions can be reduced by increasing a temperature of intake air during initial cold start of an engine.

BACKGROUND

A turbocharger is an apparatus which rotates a turbine using pressure and thermal energy of exhaust gas generated during the power strokes of an engine, and thus, rotates an impeller provided on the same rotating shaft as that of the turbine so that air drawn through an air cleaner is pushed into a combustion chamber of the engine. Here, intake air is supercharged and an air charge rate is therefore increased, thus promoting improvement in output of the engine and reduction in exhaust gas emissions.

A supercharger is also provided in some vehicles, which is operated using power of an engine or a motor to supercharge intake air for the engine, thus enhancing the output of the engine.

However, even when both the supercharger and the turbocharger are installed together, because exhaust gas is discharged without being increased in temperature to sufficient degree at start of a vehicle, that is, during cold M start, fresh air that is not heated is supplied to an intake manifold. Thus, there is a problem of deterioration in characteristics of exhaust gas such as CO, tetrahydrocannabinol (THC), etc. due to combustion instability by temperature reduction in a late period of a compression stroke of a cylinder when the engine is operated in the cold start.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to propose a method for controlling an engine system which can increase the temperature of air supercharged into an intake manifold of an engine at an initial stage of cold start of the engine, thus reducing harmful exhaust gas emissions.

According to one embodiment, a method for controlling an engine system having a supercharger and a turbocharger includes: an accelerator-pedal-opening-degree determination operation of determining, by a controller, whether an opening degree of an accelerator pedal detected after an engine starts is a first reference value or more; a first coolant temperature determination operation of determining whether, when the opening degree of the accelerator pedal determined in the accelerator-pedal-opening-degree determination operation is less than the first reference value, a detected temperature of a coolant is a second reference value or more; a second coolant temperature determination operation of determining whether the temperature of the coolant determined in the first coolant temperature determination operation is the second reference value or more and is within a temperature threshold in the controller; and a boosting operation of, by the controller, calculating boosting contribution rates of the supercharger and the turbocharger, respectively, when the determined temperature of the coolant is within the temperature threshold in the second coolant temperature determination operation, and driving the supercharger and the turbocharger using the calculated boosting contribution rates.

In the accelerator-pedal-opening-degree determination operation, when the determined opening degree of the accelerator pedal is the first reference value or more, the controller may determine that the engine is in a rapid acceleration driving mode and complete the controlling of the engine system.

In the first coolant temperature determination operation, when the determined temperature of the coolant is less than the second reference value, the supercharger may conduct boosting.

In the first coolant temperature determination operation, after the supercharger conducts boosting, the first coolant temperature determination operation may be repeatedly conducted.

In the second coolant temperature determination operation, when the determined temperature of the coolant is the second reference value or more and is not within the temperature threshold, the turbocharger and the supercharger may be operated so that the turbocharger takes charge of main boosting while the supercharger aids the main boosting of the turbocharger.

In the boosting operation, based on the detected temperature of the coolant and temperature threshold values, the boosting contribution rate of the supercharger may be calculated, and the supercharger may be operated by the calculated boosting contribution rate.

In the boosting operation, the supercharger may be operated by the boosting contribution rate of the supercharger that is calculated based on the detected temperature of the coolant and temperature threshold values, and the turbocharger may be operated by a rate corresponding to a remainder obtained by subtracting the boosting contribution rate of the supercharger from 100%.

In the boosting operation, the boosting contribution rate of the supercharger may be calculated based on the detected temperature of the coolant and temperature threshold values, wherein the supercharger and the turbocharger may be controlled based on rates at which the sum of the boosting contribution rate of the supercharger and the boosting contribution rate of the turbocharger is 100%.

According to another embodiment, a method for controlling an engine system, which includes: a turbocharger operated by exhaust gas discharged from an engine and conducting a supercharging operation at an intake side; and a supercharger coupled to an intake line of the engine and conducting a supercharging operation at the intake side, includes calculating, by a controller, boosting contribution rates of the turbocharger and the supercharger, respectively, based on a temperature of a coolant detected by a sensor, and operating the supercharger and the turbocharger using the calculated boosting contribution rates.

According to yet another embodiment, a method for controlling an engine system which includes a supercharger and a turbocharger, includes calculating boosting contribution rates of the supercharger and the turbocharger, respectively, based on an opening degree of an accelerator pedal and a temperature of a coolant. The supercharger is operated using the calculated boosting contribution rates, whereby during cold start, a temperature of intake air is increased so that harmful exhaust gas emissions are reduced.

A method for controlling an engine system according to the present invention aims to increase the temperature of air in an intake manifold of an engine at the initial stage of cold start of a vehicle and thus reduce harmful exhaust gas emissions. It is the gist of the present invention that a supercharger is used to increase the temperature of air in the intake manifold at the initial stage of the cold start. That is, as the supercharger is mounted to a rear end of an intercooler, air increased in temperature during an operation of compressing the air can be supplied to the intake manifold as much as possible. Therefore, in a section in which the temperature of coolant is low, the use rate of the supercharger is maximized. After the temperature of coolant is increased to a predetermined level or more, the supercharger is operated only with the purpose of improving the boosting following characteristics in an acceleration section so that the temperature of air in the intake manifold of the engine at the initial stage of the cold start can be increased, whereby harmful exhaust gas emissions can be reduced.

BRIEF DESCRIPTION OF THE DRAWINGS

The above and other objects, features and other advantages of the present disclosure will be more clearly understood from W the following detailed description when taken in conjunction with the accompanying drawings.

FIG. 3 is a graph showing boosting regions of a supercharger and a turbocharger of the engine system of FIG. 1 as a function of the temperature thereof.

DETAILED DESCRIPTION OF THE INVENTION

Hereinafter, a method for controlling an engine system according to an exemplary embodiment in the present disclosure will be described in detail with reference to the attached drawings.

Figure 1:
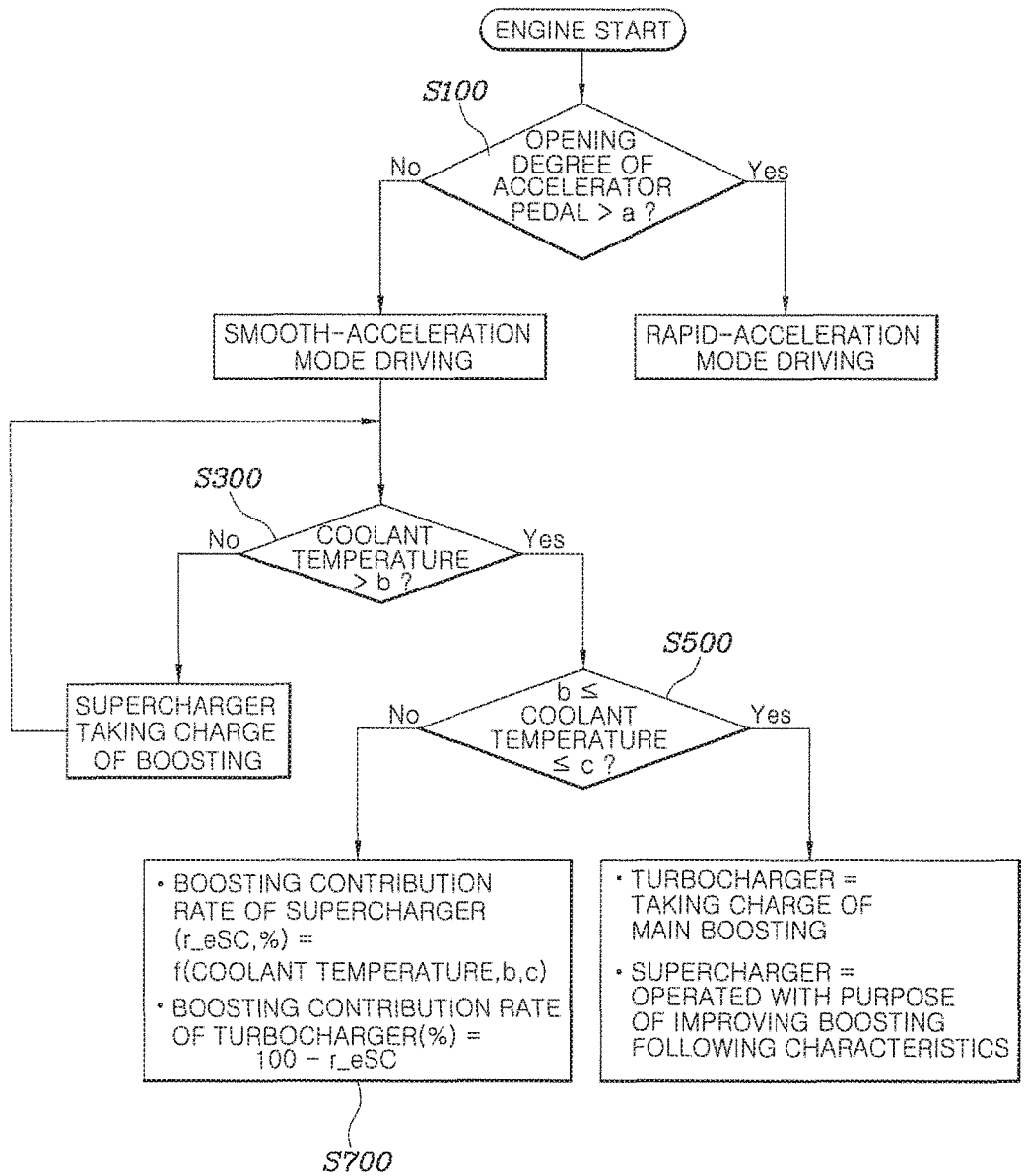
FIG. 1 is a flowchart showing a method for controlling an engine system according to an embodiment in the present disclosure.
Figure 2:
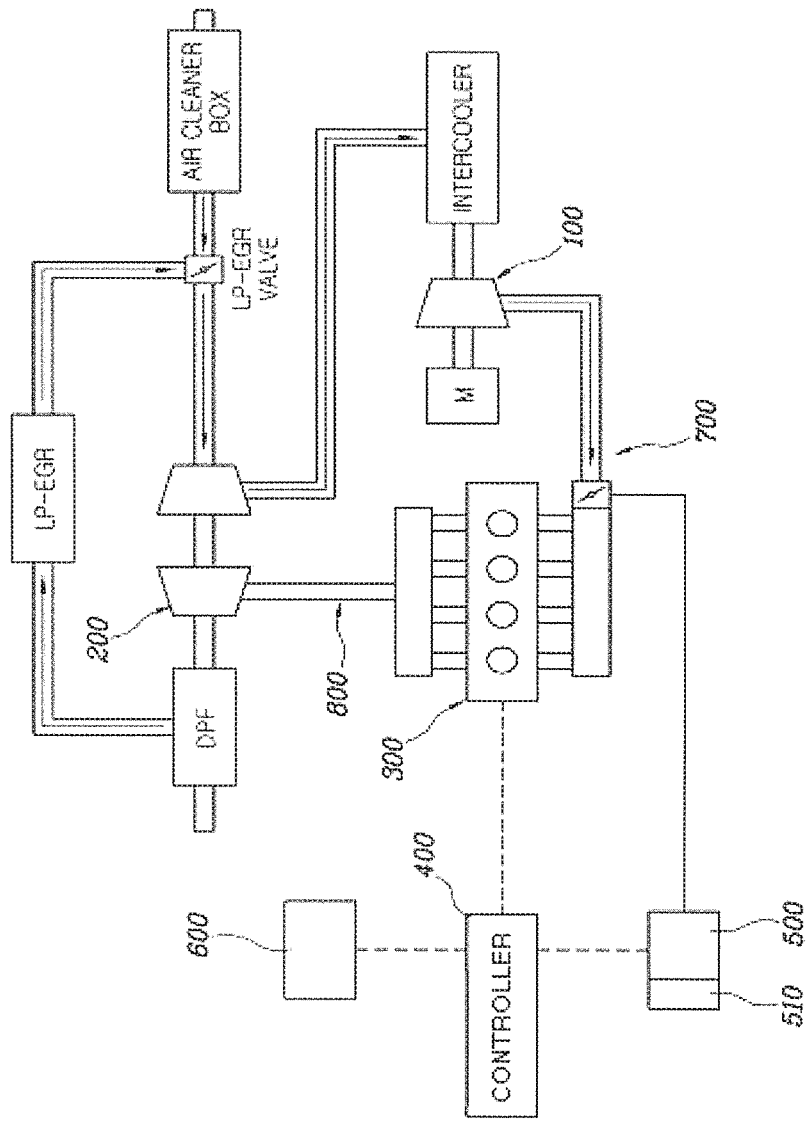
FIG. 2 is a view showing a configuration of the engine system of FIG. 1.

FIG. 1 is a flowchart showing an engine system control method according to an embodiment in the present disclosure. FIG. 2 is a view showing the configuration of the engine system FIG. 1. FIG. 3 is a graph showing boosting regions of supercharger and a turbocharger of the engine system of FIG. 1 as a function of the temperature thereof.

According to an exemplary embodiment in the present disclosure, a method for controlling an engine system having a supercharger 100 and a turbocharger 200 includes: an accelerator-pedal-opening-degree determination operation S100 of determining, by a controller 400, whether an opening degree of an accelerator pedal 500 detected after an engine 300 starts is a reference value (a) preset in the controller 400 or more; a first coolant temperature determination operation S300 of determining whether, when the opening degree of the accelerator pedal 500 determined in the accelerator-pedal-opening-degree determination operation S100 is less than the reference value (a) preset in the controller 400, a detected temperature of a coolant is a reference value (b) preset in the controller 400 or more; a second coolant temperature determination operation S500 of determining whether the temperature of the coolant determined in the first coolant temperature determination operation S300 is the reference value (b) preset in the controller 400 or more and is within a temperature range (b temperature of coolant c) preset in the controller 400; and a boosting operation S700 of calculating, by the controller 400, boosting contribution rates of the supercharger 100 and the turbocharger 200 when the determined temperature of the coolant is within the temperature range (b≤temperature of coolant≤c) preset in the controller 400 in the second coolant temperature determination operation S500, and driving the supercharger 100 and the turbocharger 200 using the calculated boosting contribution rates.

As shown in FIG. 2, the engine system used in the control method according to the present disclosure includes the turbocharger 200 which is provided on an exhaust line 800 of the engine 300, an intercooler by which air compressed by the turbocharger 200 is cooled, and the electric supercharger 100 which is provided on a rear end of the intercooler and supplies compressed air to an intake line 700. Furthermore, a low-pressure exhaust gas recirculation (LP-EGR) apparatus may be provided for ensuring a predetermined EGR supply rate when operating the supercharger 100.

After the engine 300 starts, the controller 400 conducts the accelerator-pedal-opening-degree determination operation S100 of detecting the opening degree of the accelerator pedal 500 using a sensor 510 and determining whether the detected opening degree of the accelerator pedal 500 is the reference value (a) preset in the controller 400 or more, in the accelerator-pedal-opening-degree determination operation S100, when the determined opening degree of the accelerator pedal 500 is the reference value (a) preset in the controller 400 or more, the controller 400 determines that the engine is in a rapid-acceleration driving mode and completes the operation of controlling the engine system under cold start conditions. The method for controlling an engine system according to an embodiment in the present disclosure thus can prevent deterioration in characteristics of exhaust gas such as CO, THC, etc. due to combustion instability by a temperature reduction in a late period of a compression stroke of a cylinder when the engine is operated in an initial stage of the cold start. When the opening degree of the accelerator pedal 500 is the preset reference value (a) or more, it is determined that the engine 300 is in the rapid-acceleration driving mode, and thus, the engine 300 is controlled in the existing typical manner.

After the engine 300 starts, if the opening degree of the acceleration pedal 500 determined in the accelerator-pedal-opening-degree determination operation S100 is less than the reference value (a) preset in the controller 400, the controller 400 determines that the engine 300 is in a smooth-acceleration driving mode rather than in the rapid-acceleration driving mode and conducts the first coolant temperature determination operation S300 of determining whether the temperature of the coolant that is detected by a sensor 600 is the reference value (b) preset in the controller 400 or more.

In the first coolant temperature determination operation S300, when the determined temperature of the coolant is less than the reference value (b) preset in the controller 400, the supercharger 100 takes complete charge of boosting. After the supercharger 100 conducts the boosting under the control of the controller 400 for a predetermined period of time, the first coolant temperature determination operation S300 is repeatedly conducted.

When, in the first coolant temperature determination operation S300, the determined temperature of coolant is the reference value (h) preset in the controller 400 or more, the second coolant temperature determination operation S500 of determining whether the determined temperature of coolant is within the temperature range (b≤temperature of coolant≤c) preset in the controller 400 is conducted.

In the second coolant temperature determination operation S500, when the determined temperature of coolant is the reference value (b) preset in the controller 400 or more and is not within the temperature range (b≤temperature of coolant≤c) preset in the controller 400, the turbocharger 200 and the supercharger 100 are operated so that the turbocharger 200 takes charge of main boosting while the supercharge 100 aids in the operation of the turbocharger 200. That is, in this case, the supercharger 100 improves the boosting following characteristics of the turbocharger 200.

However, if the temperature of coolant determined an the first coolant temperature determination operation S300 is the reference value (b) preset in the controller 400 or more and the temperature of coolant determined in the second coolant temperature determination operation S500 is within the temperature range (b temperature of coolant c) preset in the controller 400, the boosting operation S700 of calculating, by the controller 400, boosting contribution rates of the supercharger 100 and the turbocharger 200 and driving the supercharger 100 and the turbocharger 200 using the calculated boosting contribution rates is conducted.

In the boosting operation S700, based on the detected temperature of coolant and the range values (b and c of b≤temperature of coolant≤c) of the temperature of coolant preset in the controller 400, the boosting contribution rate of the supercharger 100 is calculated, and the supercharger 100 is operated by the calculated boosting contribution rate.

That is, in the boosting operation S700, the boosting contribution rate of the supercharger 100 is calculated based on the detected temperature of coolant and the range values of the temperature of coolant preset in the controller 400, and the supercharger 100 is operated by the calculated boosting contribution rate. Because controlling the supercharger 100 and the turbocharger 200 follows a ratio, the turbocharger 200 is operated by a rate corresponding to a remainder obtained by subtracting the boosting contribution rate of the supercharger 100 from 100%.

In more detail, in the boosting operation S700, the boosting contribution rate of the supercharger 100 is calculated based on the detected temperature of coolant and the range values of the temperature of coolant preset in the controller 400. The supercharger 100 and the turbocharger 200 are controlled based on the rates at which the sum of the boosting contribution rate of the supercharger 100 and the boosting contribution rate of the turbocharger 200 becomes one hundred.

In summary, the engine system used in the control method according to the present disclosure includes the turbocharger 200 which is operated by exhaust gas discharged from the engine 300 and conducts supercharging at the intake side. The supercharger 100 is coupled to the intake line 0 of the engine 300 and conducts supercharging at the intake side. The controller 400 calculates the boosting contribution rates of the turbocharger 200 and the supercharger 100 based on the temperature of coolant detected by the sensor 600 and operates the supercharger 100 and the turbocharger 200 using the calculated boosting contribution rates.

As such, in the engine system including the supercharger 100 and the turbocharger 200, the boosting contribution rates of the supercharger 100 and the turbocharger 200 are calculated based on the opening degree of the accelerator pedal 500 and the temperature of coolant, and the supercharger 100 is operated using the calculated value. Therefore, during cold start, the temperature of intake air is increased so that harmful exhaust gas emissions can be reduced.

The above-mentioned characteristics of the present disclosure can be understood from the graph of FIG. 3. The engine system is controlled, such that in a cold operation section, boosting is performed using the supercharger 100. In an overlapping section, the boosting contribution rates of the supercharger 100 and the turbocharger 200 are changed in a warm operation section, on the basis of the boosting of the turbocharger 200, the supercharger 100 aids in the boosting in a transition section. In this way, at the initial stage of the cold start, the temperature of air in an intake manifold of the engine 300 can be increased, whereby harmful exhaust gas emissions can be reduced.

As described above, a method for controlling an engine system according to the present disclosure aims to increase the temperature of air in an intake manifold of an engine at the initial stage of cold start of a vehicle, and thus, reduce harmful exhaust gas emissions the gist of the present disclosure that a supercharger is used to increase the temperature of air in the intake manifold at the initial stage of the cold start. That is, as the supercharger is mounted to a rear end of an intercooler, air increased in temperature during an operation of compressing the air can be supplied to the intake manifold as much as possible. Therefore, in a section in which the temperature of coolant is low, the use rate of the supercharger is maximized. After the temperature of coolant increased to a predetermined level or more, the supercharger is operated only with the purpose of improving the boosting following characteristics in an acceleration section so that the temperature of air in the intake manifold of the engine at the initial stage of the cold start can be increased, whereby harmful exhaust gas emissions can be reduced.

Although the exemplary embodiment in the present disclosure has been described for illustrative purposes, those skilled in the art will appreciate that various modifications, additions, and substitutions are possible, without departing from the scope and spirit, of the invention as disclosed in the accompanying claims.

What is claimed is:

1. A method for controlling an engine system having a supercharger and a turbocharger, wherein the supercharger is mounted to a rear end of an intercooler, the method comprising:
    an accelerator-pedal-opening-degree determination operation of determining, by a controller, whether an opening degree of an accelerator pedal detected after an engine starts is a first reference value or more;
    a first coolant temperature determination operation of determining whether, when the opening degree of the accelerator pedal determined in the accelerator-pedal-opening-degree determination operation is less than the first reference value, a detected temperature of a coolant is a second reference value or more;
    a second coolant temperature determination operation of determining whether the temperature of the coolant determined in the first coolant temperature determination operation is the second reference value or more and is within a temperature range; and a boosting operation of, by the controller, calculating boosting contribution rates of the supercharger and the turbocharger, respectively, when the determined temperature of the coolant is within the temperature range in the second coolant temperature determination operation, and driving the supercharger and the turbocharger using the calculated boosting contribution rates, wherein in the accelerator-pedal-opening-degree determination, operation, when the determined opening degree of the accelerator pedal is the first reference value or more, the controller determines that the engine is in a rapid-acceleration driving mode and terminates the method for controlling the engine system.

2. The method according to claim 1, wherein in the first coolant temperature determination operation, when the determined temperature of the coolant is less than the second reference value, the supercharger performs boosting.

3. The method according to claim 2, wherein in the first coolant temperature determination operation, after the supercharger performs the boosting, the first coolant temperature determination operation repeats.

4. The method according to claim 1, wherein in the second coolant temperature determination operation, when the determined temperature of the coolant is the second reference value or more and is not within the temperature range, the turbocharger takes performs main boosting while the supercharger aids the main boosting of the turbocharger.

5. The method according to claim 1, wherein in the boosting operation, the boosting contribution rate of the supercharger is calculated based on the detected temperature of the coolant and range values of the temperature of the coolant that are preset in the controller, and the supercharger is operated by the calculated boosting contribution rate.

6. The method according to claim 5, wherein in the boosting operation, the supercharger is operated by the boosting contribution rate of the supercharger that is calculated based on the detected temperature of the coolant and temperature range values, and the turbocharger is operated by a rate corresponding to a remainder obtained by subtracting the boosting contribution rate of the supercharger from 100%.

7. The method according to claim 1, wherein in the boosting operation, the boosting contribution rate of the supercharger is calculated based on the detected temperature of the coolant and temperature range values, and wherein the supercharger and the turbocharger are controlled based on rates at which the sum of the boosting contribution rate of the supercharger and the boosting contribution rate of the turbocharger is 100%.

* * * * *